United States Patent [19]

Ogawa

[11] Patent Number: 5,212,556
[45] Date of Patent: May 18, 1993

[54] ELECTRONIC STILL CAMERA HAVING INTERVAL REPRODUCING AND ERASING CAPABILITY

[75] Inventor: Kimiaki Ogawa, Tokyo, Japan

[73] Assignee: Asahi Kogaku Kogyo K.K., Tokyo, Japan

[21] Appl. No.: 658,166

[22] Filed: Feb. 7, 1991

[30] Foreign Application Priority Data

Feb. 9, 1990 [JP] Japan .................................. 2-30490
Feb. 9, 1990 [JP] Japan .................................. 2-30491

[51] Int. Cl.⁵ .......................................... H04N 5/225
[52] U.S. Cl. ................. 358/209; 358/909; 358/906; 358/335; 360/66
[58] Field of Search ............... 358/209, 909, 906, 224, 358/310, 335; 354/289.1, 75, 76; 360/66, 61, 78.07

[56] References Cited

U.S. PATENT DOCUMENTS

| | | | |
|---|---|---|---|
| 4,456,931 | 6/1984 | Toyoda | 358/335 |
| 4,539,711 | 9/1985 | Harger | 455/166 |
| 4,746,993 | 5/1988 | Tada | 358/909 |
| 4,786,982 | 11/1988 | Wakahara | 358/335 |
| 4,849,832 | 7/1989 | Yamagata | 360/66 |
| 4,858,028 | 8/1989 | Okino | 358/909 |
| 4,858,031 | 8/1989 | Fukuta | 358/906 |
| 4,982,291 | 1/1991 | Kurahashi | 358/335 |
| 5,086,345 | 2/1992 | Nakane | 358/909 |

FOREIGN PATENT DOCUMENTS

| | | |
|---|---|---|
| 0271869 | 6/1988 | European Pat. Off. |
| 61-280195 | 10/1986 | Japan. |
| 0098874 | 5/1987 | Japan. |
| 1-191585 | 8/1989 | Japan. |
| 1-251896 | 10/1989 | Japan. |
| 1-321787 | 12/1989 | Japan. |

Primary Examiner—James J. Groody
Assistant Examiner—Sherrie Hsia
Attorney, Agent, or Firm—Sughrue, Mion, Zinn Macpeak & Seas

[57] ABSTRACT

Audio and/or video signals are recorded on coaxial tracks of a magnetic disk in an electronic still camera. Control circuitry is provided to implement playback from or erasure of a single track, all of the tracks, or a selected plurality of adjacent tracks In the latter case the R/W head is accessed to a predetermined "starting" track, whereafter the playback or erasing operation is performed on successive tracks radially inwardly or outwardly from the starting track until a predetermined "final" track is reached.

20 Claims, 6 Drawing Sheets

ERASING MODE, STANDBY STATE

ERASING MODE, DURING ERASING

ERASING MODE, DURING CONTINUOUS ERASING

REPRODUCTION STANDBY STATE

DURING REPRODUCTION (VIDEO ONLY)

DURING INTERVAL REPRODUCTION (VIDEO TRACK)

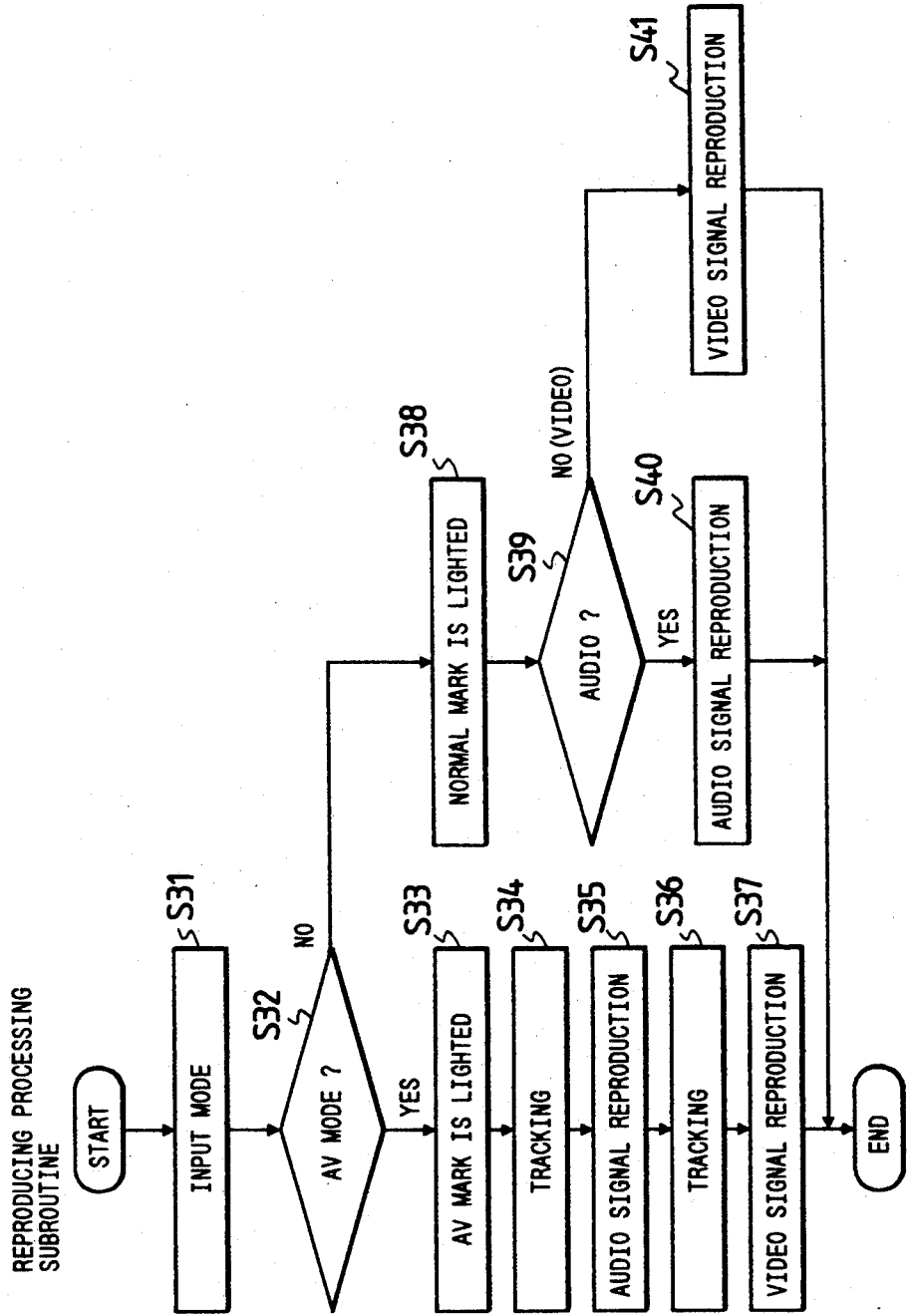

ELECTRONIC STILL CAMERA HAVING INTERVAL REPRODUCING AND ERASING CAPABILITY

BACKGROUND OF THE INVENTION

This invention relates to an electronic still camera having both a continuous reproducing mode and a continuous erasing mode in which a video signal and an audio signal are recorded on a magnetic disk and the recorded signals can be selectively reproduced and/or erased therefrom.

In an electronic still camera, video signals and/or audio signals are recorded on tracks which are arranged coaxially on a magnetic disk. The reproducing and/or erasing of the signals thus recorded is carried out individually or separately for each track. Thus, in reproducing and/or erasing signals from a number of tracks, it is disadvantageously necessary to perform the signal reproducing and erasing operations repeatedly. In order to overcome this difficulty, a method of reproducing or erasing signals from all the tracks by only one operation has been proposed in the art.

Thus, in the conventional electronic still camera, the reproducing or erasing of signals from the magnetic disk are carried out individually for each track, or the signals of all the tracks are reproduced or erased at the same time. Hence, when it is desired to ignore the signals of some tracks and to just reproduce or erase the signals from the remaining relatively large number of tracks, it is still necessary to perform the signal producing erasing operation for each selected track individually.

Conventionally, in order to adapt an ordinary electronic still camera so as to have multifunctions, additional switches, additional displays, additional wiring and its wiring space and like is required. However, the provision of such additional elements is disadvantageous in that it is necessary to increase the number of input switches and to increase the area of the LCD 12 thereby resulting in increasing the manufacturing cost.

SUMMARY OF THE INVENTION

In view of the foregoing, an object of this invention is to provide an electronic still camera in which the signals of a relatively large number of tracks can be successively reproduced or erased in one operation and no additional elements are required to adapt the camera to have multifunctions.

It is another object of the invention to provide an electronic still camera capable of controlling the reproduction of a video track so that the reproduction of the following video track is not allowed to start before the completion of reproducing an audio track therefor.

In the electronic still camera of this invention, when a reproducing or erasing operation is started in the selected mode, tracks located radially inwardly or outwardly of the predetermined track where the magnetic head is positioned are reproduced or erased beginning with the predetermined track. Hence, the signals recorded in the selected relatively large number of tracks can be successively reproduced or erased in one operation. Of course, only a single track can also be selected for reproduction or erasure, or an arbitrary number of tracks can be reproduced or erased in one operation.

With an electronic camera according to the present invention, an additional element normally irrelevant to the reproducing or erasing operation is used when either the continuous erasing mode or the continuous reproducing mode is selected. In this case, the additional elements is not limited to those for use in the continuous shooting mode only; however, it is preferable to employ the continuous shooting mark because it is displayed for a continuous type of operation, and therefore when it is displayed together with the PLAY or ERASE mark, the operator can easily recognize that the continuous reproducing mode or the continuous erasing mode has been selected.

The present disclosure relates to the subject matter contained in Japanese patent application Nos. Hei. 2-30490 and 2-30491 (filed on Feb. 9, 1990) which are expressly incorporated herein by reference in their entirety.

BRIEF DESCRIPTION OF THE DRAWINGS 7

FIG. 1 is a block diagram showing the arrangement of an electronic still camera according to this invention, FIGS. 2(a), 2(b) and 2(c) show examples of an LCD display in the electronic still camera for an erasing operation, FIG. 3 is a flow chart of the erasing operation in the camera, FIGS. 4(a), 4(b) and 4(c) show the LCD display for a playback operation, and FIGS. 5(a) and 5(b) are flow charts of the playback operation.

DETAILED DESCRIPTION OF THE PREFERRED EMBODIMENT

Figure 1:
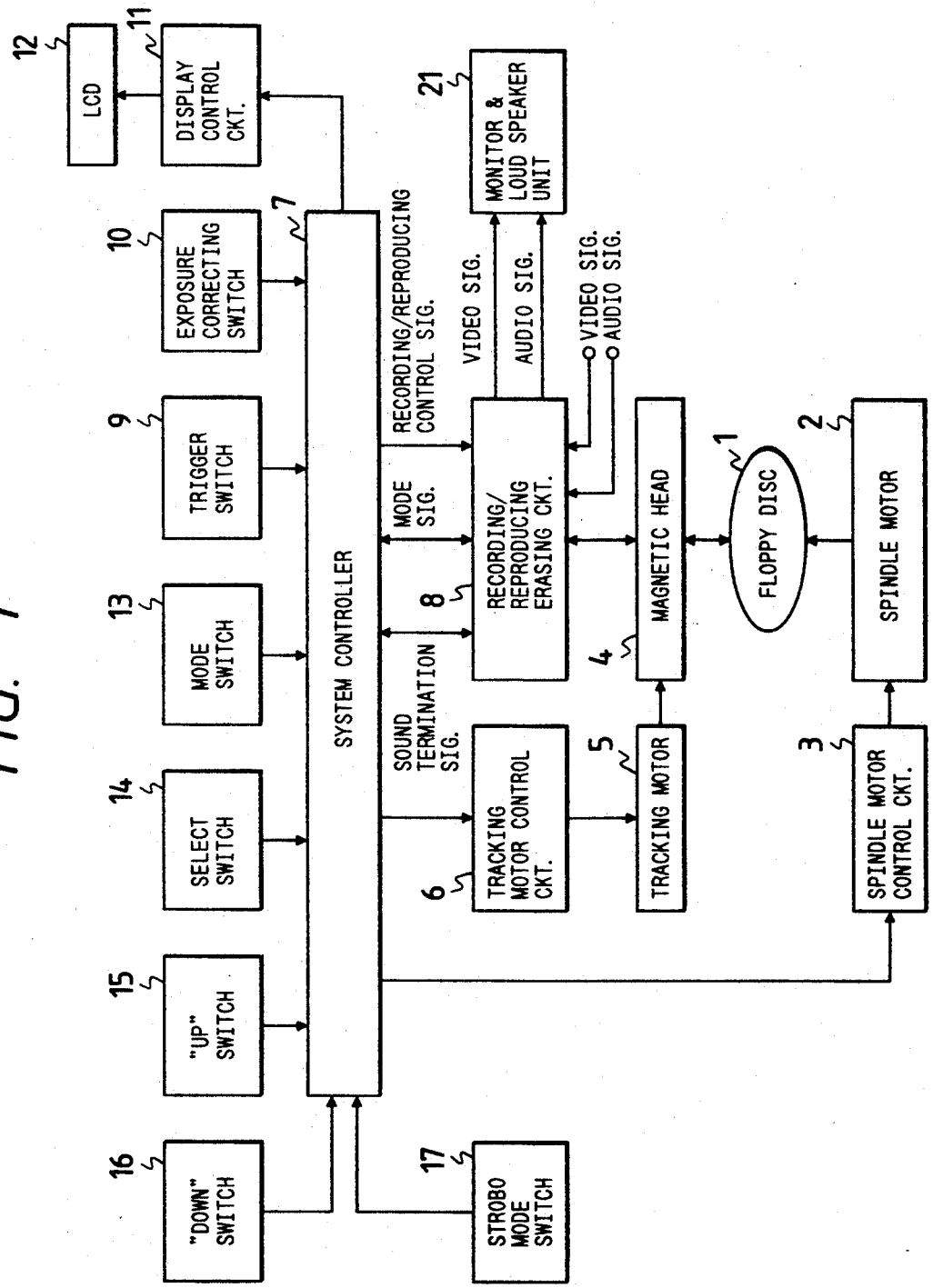

Referring to FIG. 1, a floppy disk (magnetic disk) 1 is rotated by a spindle motor 2 which is controlled by a spindle motor control circuit 3. A magnetic head 4 operates to record video signals and/or audio signals on the rotating floppy disk and reproduces or erases the signals therefrom. In this operation, the magnetic head 4 is moved radially of the floppy disk by a tracking motor 5 which is controlled by a tracking motor control circuit 6. The magnetic head 4 is driven by recording, reproducing and erasing circuit 8, to perform a selected operation.

A system controller 7 comprising a microcomputer controls the tracking motor control circuit 6 and the circuit 8, and controls a display control circuit 11 to display predetermined information on a liquid crystal display unit (LCD) 12. Furthermore, the system controller 7 performs control operations for the data recording, reproducing and erasing operations on the floppy disk 1. The system controller 7 receives signals which are provided when a trigger switch (release switch) 9, an exposure correcting switch 10, a mode switch 13, and a select switch 14 are operated. The trigger switch 9 is operated to start the data recording, reproducing or erasing operation, the exposure correcting switch 10 is operated for exposure correction, and the mode switch 13 is operated to select one of the various modes such as data recording, data reproducing and data erasing. The numerical data displayed on the LCD 12 can be increased by operating an "up" switch 15, and it can be decreased by operating a "down" switch 16. A predetermined strobe mode can be inputted by operating a strobe mode switch 17.

The operation of the electronic still camera thus organized will be described.

Figure 2A:
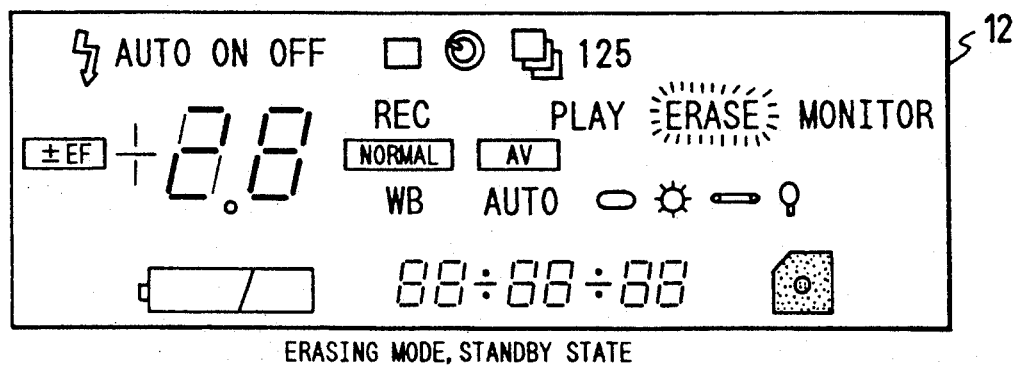
Figure 2B:
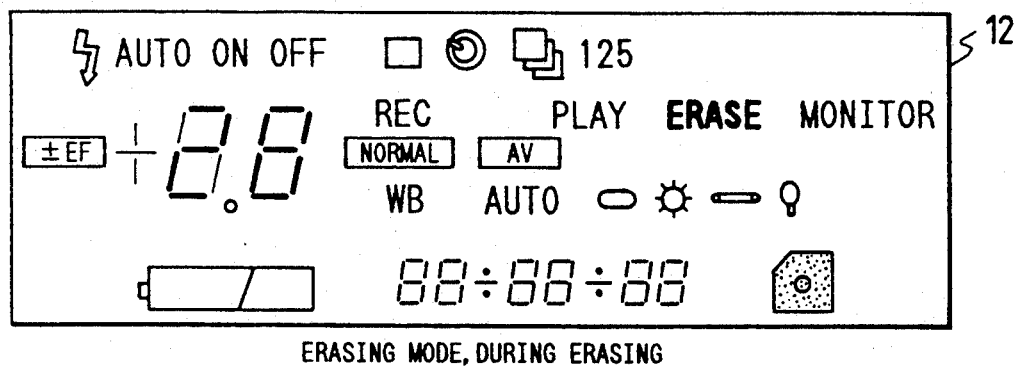
Figure 2C:
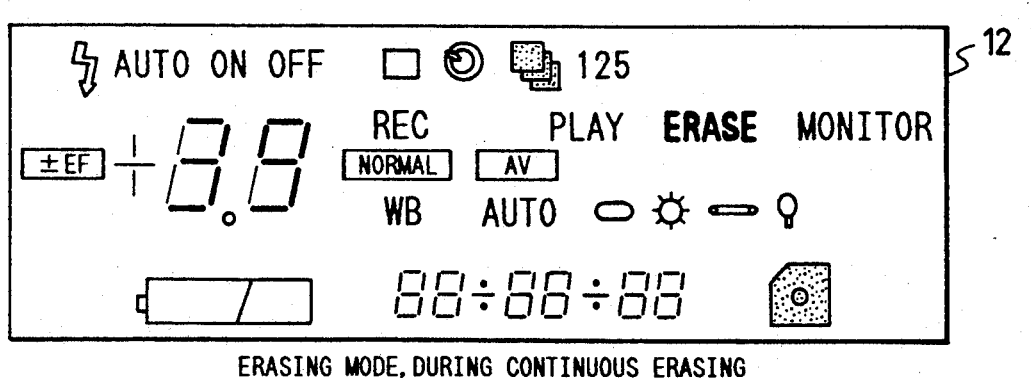

FIGS. 2(a), 2(b) and 2(c) show examples of the display on the LCD 12. Various marks are displayed on the LCD 12. The flickering display position for the marks is moved vertically by operating the mode switch 13, and is moved horizontally by operating the select switch 14. For instance, whenever the mode switch 13 is operated, the flickering display mark is moved to a single mode mark (one rectangular mark) representing the recording of video signals corresponding to one picture, e.g. a REC mark representing a recording mode, a NORMAL mark representing a normal mode for the recording of video signals or audio signals, an AUTO mark in the white balance display mark WB, and 7-segment elements indicating year, month and day, or o'clock, minute and second.

When the select switch 14 is operated with the single mode mark kept flickering in the uppermost row, a self timer mark for setting the self timer, a continuous shooting mark (three overlapped rectangular marks) representing a mode of recording video signals at one, two or five pictures per second, and the digit "1", "2" or "5" representing the number of pictures to be shot per second are successively caused to flicker.

Similarly, in the display of the second row, the REC mark representing the recording mode, a PLAY mark representing a playback mode, an ERASE mark representing an erasing mode, and a MONITOR mark representing a monitor mode are selectively displayed.

In the third row, the NORMAL mark representing the normal mode for recording video signals or audio signals, and an AV mark representing an AV mode for recording video signals and audio signals in combination are selectively displayed.

Following the white balance mark WB in the fourth row, an AUTO mark representing an auto mode, a cloudy weather mark (a pattern of a cloud) representing a cloudy weather mode, a fine weather mark (a pattern of the sun) representing a fine weather mode, a fluorescent lamp mark (a pattern of a fluorescent lamp) representing a fluorescent lamp mode, and an incandescent lamp mark (a pattern of an incandescent lamp mark) representing an incandescent lamp mode are successively selected in the display.

In the fifth row, the digits representing year, month and day (or o'clock, minute and second) are selectively displayed.

A battery mark is provided on the left side of the 7-segment elements. When the voltage of the battery is decreased to a certain value, the battery mark is caused to flicker. A disk mark is provided on the right side of the 7-segment elements, to indicate whether or not a floppy disk is loaded. That is, the disk mark is turned on when a floppy disk is loaded.

Thus, by operating the mode switch 13 and the select switch 14, the flickering position is moved until a desired mode is selected, and the mode thus selected is applied to the system controller 7. In this operation, the marks other than the mark representing the mode being selected are also lighted, but steadily.

By operating the strobe mode switch 17, the AUTO mark, the ON mark, and the OFF mark are selectively lighted.

When, with the recording mode selected in the above-described manner (the REC mark is caused to flicker), the trigger switch 9 is operated, the system controller 7 drives the spindle motor 2 through the spindle motor control circuit 3, to rotate the floppy disk 1. On the other hand, the tracking motor 5 is driven through the tracking motor control circuit 6, so that the magnetic head 4 is moved to a predetermined track. The track position is indicated by the two digits to the left of the REC mark. Under this condition, predetermined video signals or audio signals are supplied to the magnetic head 4, so that they are recorded on the predetermined track.

If, prior to this recording operation, the exposure correcting switch 10 is operated in the recording mode, an exposure correcting mark ±EF is lighted, and the numerical data displayed by the 7-segment elements to the right of the exposure correcting mark are changed into the exposure correcting value specified. When the "up" switch 15 together with the exposure correcting switch 10 is operated, the exposure correcting value is increased; when the "down" switch 16 together with the exposure correcting switch 10 is operated, the exposure correcting value is decreased. When the trigger switch 9 is operated together with the exposure correcting switch 10, the photographing operation is carried out with the exposure set to the exposure correcting value.

When the continuous shooting mode is set in the recording mode, the continuous shooting mark is lighted, so that, of the digits "1", "2" and "5", the digit corresponding to the selected number of pictures to be shot per second is caused to flicker. In this case, when the trigger switch 9 is operated, the video signals for the specified number of pictures per second are continuously recorded.

When the playback mode is specified (the PLAY mark flickers) and the trigger switch 9 is operated, the system controller 7 operates the spindle motor 2 through the spindle motor control circuit 3 to rotate the floppy disk 1, and operates the tracking motor 5 through the tracking motor control circuit 6, to move to the magnetic head 4 to a predetermined track. As a result, the signals recorded on the accessed track of the floppy disk 1 are read by the magnetic head 4, and the outputs of the latter are applied to a reproducing device such as a CRT monitor and loudspeaker unit 21.

Figure 3:
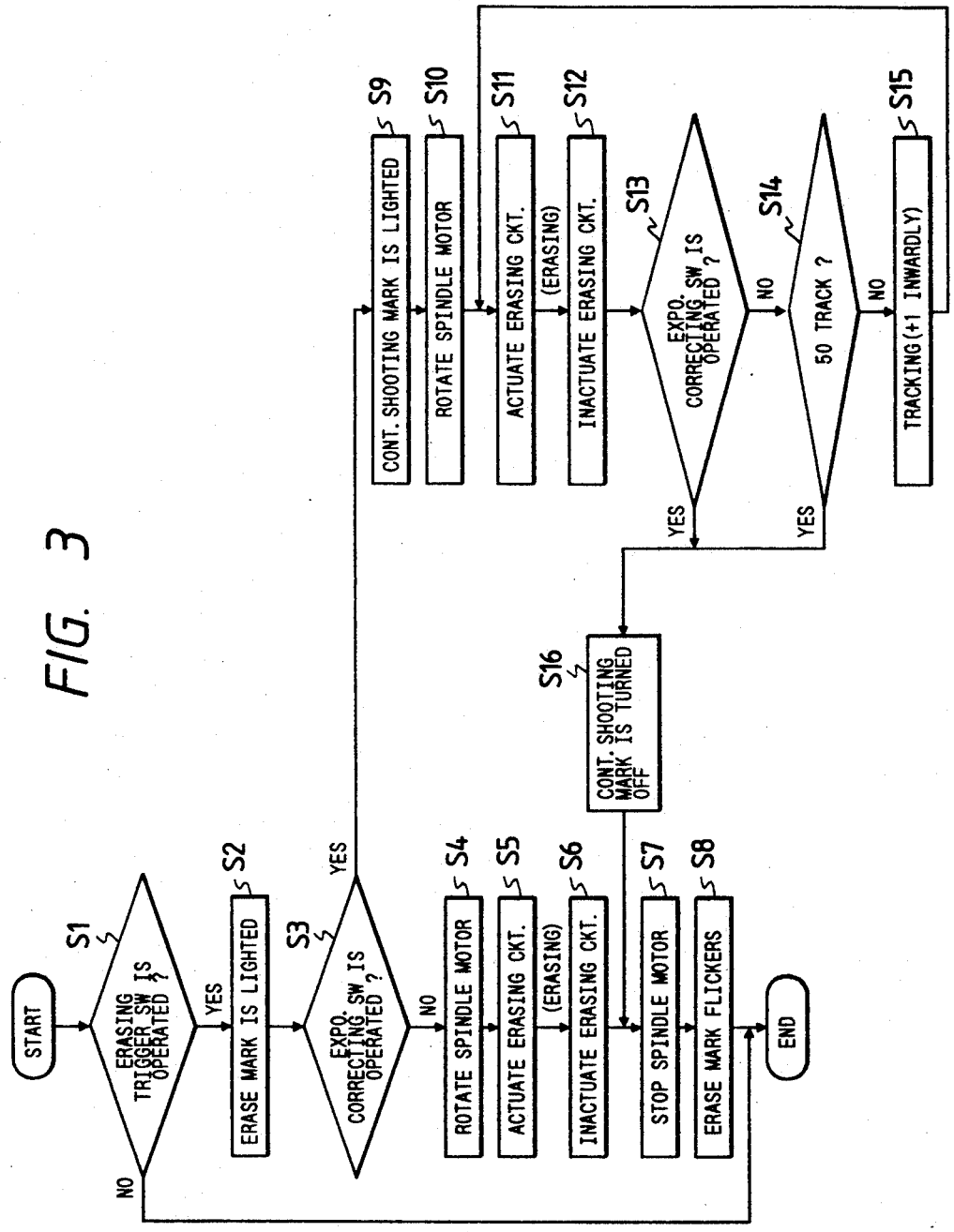

The erasing operation of the electronic still camera will now be described with reference to the flow chart of FIG. 3.

When the erasing mode is specified by operating the mode switch 13 and the select switch 14, the system controller 7 drives the LCD 12 through the display control circuit 11, so that the ERASE mark representing the erasing mode is caused to flicker, as shown in FIG. 2(a).

When, under this condition, the operator operates the "up" switch 15 (or the "down" switch 16), the track number ("28" in FIG. 2(a)) is increased (or decreased), and the magnetic head 4 is moved by the tracking motor control circuit 6 and the tracking motor 5 to the track thus displayed.

When, with the magnetic head 4 moved to the selected track, the trigger switch 9 is operated, the flickering of the ERASE mark is ceased, but it is kept lighted (Steps S1 and S2). If the exposure correcting switch 10 has not been operated yet, the floppy disk 1 is rotated, and the circuit 8 is activated to perform the erasing operation (Steps S3 through S6). The erasing operation is achieved by recording the carrier used for the FM modulation of the recording signal with the speed of rotation of the floppy disk 1 set to lower than the ordinary record and playback speed of 3600 rpm. This is equivalent to the erasing of data with higher frequency signals, with the floppy disk rotated at its ordinary rpm.

When the erasing of signals from one track has been achieved in the above-described manner, the spindle motor 2 is stopped, and the ERASE mark is caused to flicker again (Steps S7 and S8). Thus, the selected tracks can be erased one after another.

When, in the erasing mode, one of the switches irrelevant to the erasing operation (the exposure correcting switch 10 in the case of FIG. 3; however, it may be any other switch) is operated, one of the marks unrelated to the erasing operation (the continuous shooting mark in the case of FIG. 3; however, it may be any other mark) is lighted as shown in FIG. 2(c) (Steps S3 and S9). Under this condition, the spindle motor 2 is rotated, the circuit 8 is driven, and one track is erased (Steps S10, S11 and S12).

Thereafter, the exposure correcting switch 10 is operated again, and the system controller 7 determines whether or not a continuous erasing operation releasing instruction has been issued, or whether or not a predetermined final track (the 50-th track in the case of FIG. 3) has been erased. When the continuous erasing operation releasing instruction has not been issued and the final track has not been erased yet, the magnetic head 4 is moved radially inwardly (or outwardly) to the next track (Steps S13, S14 and S15).

When, with the exposure correcting switch 10 operated again, the system controller 7 determines that the continuous erasing operation releasing instruction has been issued and the final track (the fiftieth track when the erasing operation is made radially inwardly of the disk, and the first track when the erasing operation is made radially outwardly of the disk) has been erased, the continuous shooting mark is turned off, the rotation of the floppy disk 1 is stopped, and the ERASE mark When it is required to erase all the tracks of the floppy disk 1, the erasing operation should be started from the first track with the magnetic head 4 moved thereto.

In the above-described case, the continuous shooting mark which is to be displayed when the continuous shooting mode is selected, is displayed at the time the continuous erasing mode is selected; for this purpose, an additional mark for the continuous erasing mode only may be provided. However, the provision of such a mark is disadvantageous in that it is necessary to increase the area of the LCD 12. Therefore, it is preferable that, as described above, a mark irrelevant to the erasing operation is used when the continuous erasing mode is selected.

The mark is not limited to the continuous shooting mark only; however, it is preferable to employ the continuous shooting mark because it is displayed for a continuous type of operation, and therefore when it is displayed together with the ERASE mark, the operator can easily recognize that the continuous erasing mode has been selected.

In the above-described embodiment, the exposure correcting switch 10, the original function of which is not for selection of the continuous erasing mode is used to select the continuous erasing mode, but an additional switch just for selecting the continuous erasing mode may be provided. However, it should be noted that the use of the exposure correcting switch for the selection of the continuous erasing mode reduces the number of components and the number wiring steps, with the result that the manufacturing cost is decreased, and the camera dimensions are reduced.

The reproducing or playback operation will now be described with reference to FIGS. 4 and 5.

Figure 4A:
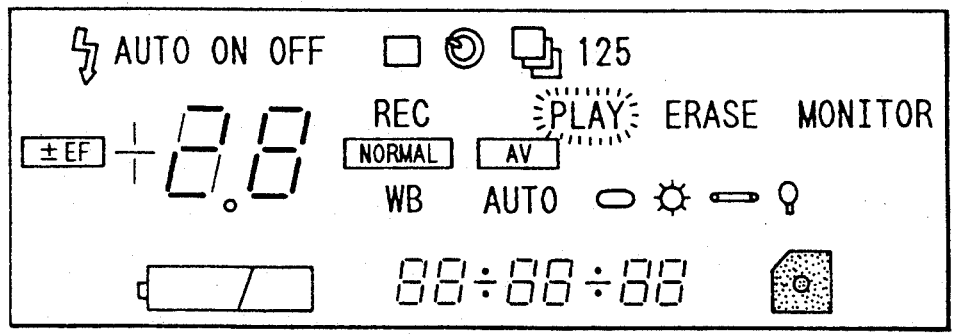
Figure 4B:
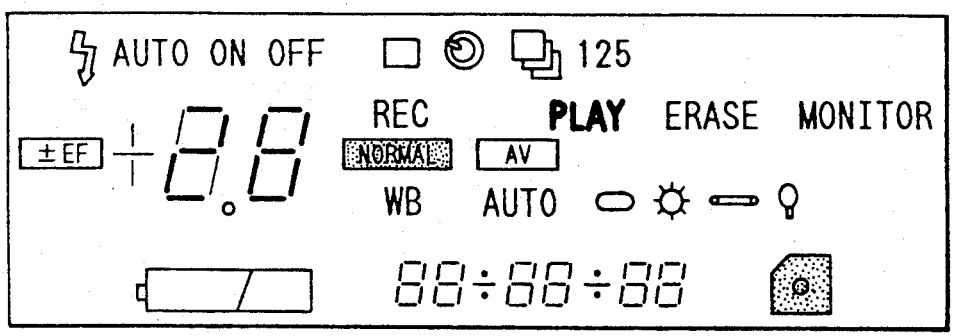
Figure 5A:
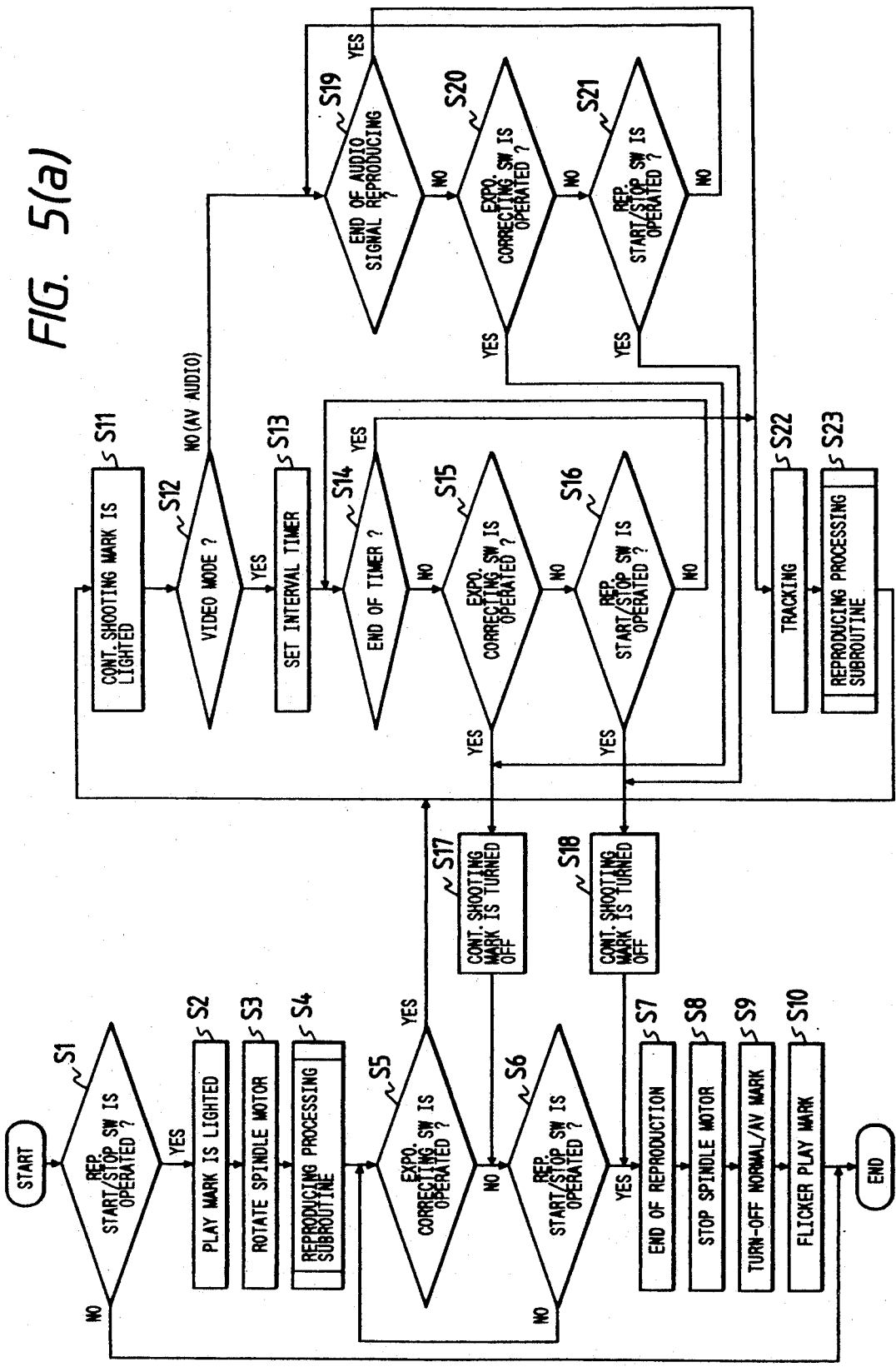

When the playback mode is selected by operating the mode switch 13 and the select switch 14, the PLAY mark is caused to flicker as shown in FIG. 4(a) When, under this condition, the trigger switch 9 is operated, the flickering of the PLAY mark is ceased and instead it is held lighted as shown in FIG. 4(b), the rotated by the spindle motor 2 under the control of the spindle motor control circuit 3, and a playback subroutine is executed (Steps S1 through S4 in FIG. 5(a)).

In the playback subroutine, a mode for a reproducing track is inputted (Step S31 in FIG. 5(b)). That is, the recording, reproducing and erasing circuit 8 demodulates the reproducing signal provided by the magnetic head 4, to read the DPSK signal recorded together with the video signal, or the control data recorded together with the audio signal. The signal or data thus read contains a signal which indicates that only the video signal is recorded in the track (a V mode) or only the audio signal is recorded in the track (an A mode), or both the video signal and the audio signal are recorded, in combination, in the track (an AV mode). The system controller 7 reads this mode information from the circuit 8.

When the AV mode is read, the AV mark is lighted, and the magnetic head 4 is moved by the tracking motor 5 under the control of the tracking motor control circuit 6 to the track where the audio signal has been recorded (Steps S32 through S34). The audio signal is reproduced from the track, and is temporarily stored in a memory in the circuit 8 (Step S35). Thereafter, the magnetic head 4 is moved to the track where the corresponding video signal has been recorded, so that the video signal is reproduced from the track (Step S36 and S37). The video signal thus reproduced is supplied to the monitor and loudspeaker unit 21, where it is displayed. At the same, the audio signal stored in the memory, after being expanded, is supplied to the monitor and loudspeaker unit 21. Thus, the video signal and its corresponding audio signal are outputted simultaneously.

When the mode for the reproducing track is not the AV mode, the NORMAL mark is lighted (Step S38, FIG. 4(b)). If what is recorded in the track is an audio signal, then the audio signal is temporarily stored in the memory in the circuit 8, and is then read out and reproduced (Step S39 and S40). If what is recorded is a video signal, then it is reproduced and supplied to the monitor and loudspeaker unit 21 as it is, where it is displayed (Step S41). "In" the case where the exposure correcting switch 10 is not operated and yet in this signal reproducing operation, the trigger switch 9 is not operated again, and the reproducing operation is continued until an instruction is issued to terminate it (Steps S5 and S6 in FIG. 5(a)).

When the instruction to terminate the reproducing operation is issued by operating the trigger switch 9 again, the rotation of the floppy disk 1 is suspended, and the NORMAL mark or the AV mark is turned off while the PLAY mark is caused to flicker again; that is, the camera is placed in the signal reproduction standby state again. Thus, the reproduction of signals from only one track has been achieved.

Figure 4C:
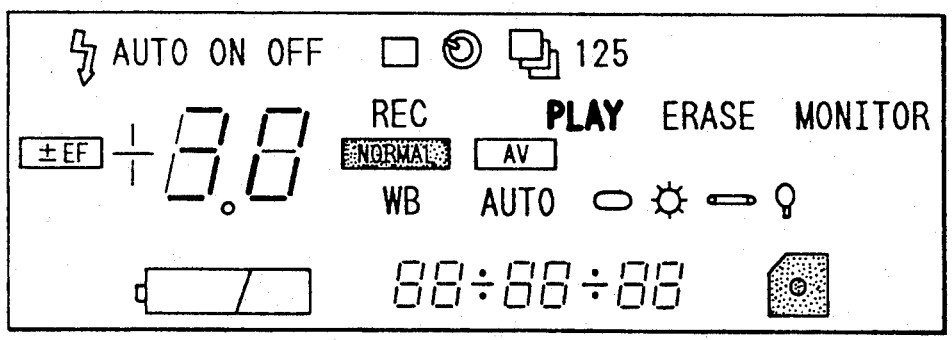

When the exposure correcting switch 10 is operated during the signal reproducing operation the continuous shooting mark is lighted as shown in FIG. 4(c) (Steps S4 and S11), and if the V mode is detected for the reproducing track, the system controller 7 activates an interval timer built therein When the interval timer counts a predetermined period of time (for instance five seconds), the magnetic head 4 is moved one track radially inwardly (or outwardly) by the tracking motor 5 (Steps S14 and S22) At the same time, the track number displayed on the LCD 12 is increased by one. And similarly as in the above-described case, the playback subroutine is carried out (Step S23). This operation is repeatedly carried out, so that the video signals each corresponding to five seconds are successively reproduced from the tracks.

Upon arrival at the last track (the innermost track), the magnetic head 4 is moved to the first track (the outermost track). Thus, all the tracks of the floppy disk 1 are reproduced one after another If, before the interval timer counts the predetermined period of time, the exposure correcting switch 10 is operated again to suspend the interval reproduction, the interval reproduction mode is eliminated, and the continuous shooting mark is turned off (Steps S15 and S17) Thus, Step S6 is effected.

If, before the interval timer counts the predetermined period of time, the trigger switch 9 is operated again to suspend the reproduction, the continuous shooting mark is turned off, and the reproduction is suspended (Steps S16, S18, and S7 throug S10).

When the A mode or AV mode is detected for the reproducing track, and the latter is related to an audio signal, the audio signal reproducing time is given precedence over the interval timer's set time. Therefore, the video signal is reproduced until the end of the reproducing audio signal, and when the audio signal is ended, reproduction of the next track is carried out (Steps S19 and S22).

In the case of the AV mode, what is recorded in the track located radially inwardly of the video track being reproduced is the corresponding audio signal, and therefore the magnetic head 4 is moved two tracks to the next video track. In the AV mode, instead of the number of the audio signal track, the number of the video track is displayed.

If, before the reproducing audio signal is ended, the exposure correcting switch 10 or the trigger switch 9 is operated again, the interval reproduction or the continuous reproduction is suspended (Steps S20, S21, S17 and S18).

As is similar in the continuous erasing mode, in the above-described case, the continuous shooting mark which is to be displayed when the continuous shooting mode is selected, is displayed at the time the continuous reproducing mode is selected; for this purpose, an additional mark for the continuous reproducing mode only may be provided. However, the provision of such a mark is disadvantageous in that it is necessary to increase the area of the LCD 12. Therefore, it is preferable that, as described above, a mark irrelevant to the reproducing operation is used when the continuous reproducing mode is selected.

The mark is not limited to the continuous shooting mark only; however, it is preferable to employ the continuous shooting mark because it is displayed for a continuous type of operation, and therefore when it is displayed together with the PLAY mark, the operator can easily recognize that the continuous reproducing mode has been selected.

It should be noted that the term continuous as used herein refers to the continuous erasing or reproduction of a plurality of tracks. In the continuous reproduction mode, each track is successively reproduced in intervals. Thus, the terms continuous reproduction and interval reproduction are synonymous.

In the above-described embodiment, the exposure correcting switch 10, the original function of which is not for selection of the continuous reproducing mode is used to select the continuous reproducing mode, but an additional switch just for selecting the continuous reproducing mode may be provided. However, it should be noted that the use of the exposure correcting switch for the selection of the continuous reproducing mode reduces the number of components and the number of wiring steps, with the result that the manufacturing cost is decreased, and the camera dimensions are reduced.

What is claimed is:

1. An electronic still camera having a plurality of operation switches, comprising:
   an image processing mode setting means for setting an image processing mode; and
   an additional image processing mode setting means for modifying the image processing mode into an additional image processing mode relative to the image processing mode when at least one of said operation switches which are not used in the image processing mode is operated with the image processing mode set by said image processing mode setting means, wherein image processing remains active and wherein said additional image processing mode setting means in itself serves to perform a function unrelated to the image processing mode.

2. An electronic still camera having a plurality of operation switches, comprising:
   an image processing mode setting means for setting an image processing mode; and
   an additional image processing mode setting means for modifying the image processing mode into an additional image processing mode relative to the image processing mode when at least one of said operation switches which are not used in the image processing mode is operated with the image processing mode set by said image processing mode setting means, said additional image processing mode setting means in itself serving to perform a function unrelated to the image processing mode, wherein said image processing mode comprises a video image reproducing mode and said additional image processing mode comprises a continuous reproduction operation.

3. An electronic still camera having a plurality of operation switches, comprising:
   an image processing mode setting means for setting an image processing mode; and
   an additional image processing mode setting means for modifying the image processing mode into an additional image processing mode relative to the image processing mode when at least one of said operation switches which are not used in the image processing mode is operated, wherein said image processing mode comprises a video image reproducing mode and said additional image processing mode comprises a continuous reproduction operation and wherein during the continuous reproducing operation, the reproduction of a video track is continuously carried out until a corresponding audio track has been reproduced completely, and following tracks are successively reproduced thereafter.

4. An electronic still camera having a plurality of operation switches, comprising:

an image processing mode setting means for setting an image processing mode; and an additional image processing mode setting means for modifying the image processing mode into an additional image processing mode relative to the image processing mode when at least one of said operation switches which are not used in the image processing mode is operated with the image processing mode comprises a video image reproducing mode and said additional image processing mode comprises a continuous reproduction operation and wherein the continuous reproducing operation is selected and interrupted to return to a usual reproducing mode by the function of an exposure correction switch and a continuous reproducing mode is displayed by the function of a continuous shooting mark in a display means.

5. The electronic still camera as defined in claim 1 wherein said image processing mode comprises an erasing mode and said additional image processing mode comprises a continuous erasing operation.

6. An electronic still camera having a plurality of operation switches, comprising:

an image processing mode setting means for setting an image processing mode; and an additional image processing mode setting means for modifying the image processing mode into an additional image processing mode relative to the image processing mode when at least one of said operation switches which are not used in the image processing mode is operated;

wherein said image processing mode comprises an erasing mode and said additional image processing mode comprises a continuous erasing operation; and wherein the continuous erasing operation is selected and interrupted to return a usual erasing mode by the function of an exposure correction switch and the continuous erasing mode is displayed by the function of a continuous shooting mark in a display means.

7. The electronic still camera as defined in claim 5 wherein the continuous erasing operation is carried out up to the fiftieth track when the erasing operation is made radially inwardly of a magnetic disk.

8. An electronic still camera, comprising:

first switching means operable to set an erasing mode;

second switching means operable to start the erasing of a predetermined track of a magnetic disk;

third switching means operable to command a continuous erasing operation, and further operable to command an operation unrelated to an erasing operation;

moving means for moving a magnetic head to said predetermined track;

erasing means operable to erase said track; and controlling means for controlling said erasing means such that, when said second switching means is operated with said erasing mode set by said first switching means, said track whereat said magnetic head is positioned is erased, and controlling said erasing means and said moving means such that, when said third switching means is operated with said erasing mode set by said first switching means, a plurality of tracks located radially inwardly or outwardly of said track whereat said magnetic head is positioned are successively erased, beginning with the track whereat said magnetic head is positioned.

9. An electronic still camera, comprising:

first switching means operable to set an erasing mode;

second switching means operable to input a predetermined instruction in a non-erasing mode so as to perform a function unrelated to erasing tracks of a magnetic disk, and further operable to start the continuous erasing of tracks of said magnetic disk;

moving means for moving a magnetic head to a predetermined one of said tracks;

erasing means operable to erase said tracks; and control means for controlling said erasing means and said moving means such that, when said second switching means is operated with said erasing mode set by said first switching means, a plurality of tracks located radially inwardly or outwardly of said predetermined track whereat said magnetic head is positioned are successively erased, beginning with said predetermined track.

10. An electronic still camera, comprising:

reproducing means for reproducing signals from a magnetic disk;

switching means operable to perform a continuous reproducing operation and further operable to perform a function unrelated to said continuous reproducing operation;

moving means for moving said reproducing means to a predetermined track on said magnetic disk;

controlling means for controlling said moving means such that, when an instruction has been issued by said switching means to perform said continuous reproducing operation, said predetermined track is reproduced for a predetermined period of time, and following tracks are successively reproduced thereafter; and display means for performing a predetermined display when a non-reproducing operation is selected, and for performing, when a continuous reproduction operation is selected, a display indicating that said continuous reproduction operation has been selected.

11. An electronic still camera, comprising:

reproducing means for reproducing signals from a magnetic disk;

first switching means operable to set a reproducing mode to reproduce signals from said magnetic disk;

second switching means operable to input a predetermined instruction during a non-reproducing operation, and to perform a continuous reproducing operation;

moving means for moving said reproducing means to a predetermined track on said magnetic disk; and controlling means for controlling said moving means such that, when in a reproducing mode, said second switching means is operated, said predetermined track is reproduced for a predetermined period of time, and following tracks are reproduced in succession.

12. An electronic still camera having a display means capable of displaying a plurality of marks each representing a plurality of image processing modes, comprising:

an image processing mode setting means for setting one of the image processing modes; and an additional image processing mode setting means for modifying the image processing mode into an additional image processing mode relative to the image processing mode, said display means displaying the additional image processing mode by the function of at least one of the marks which are not used in the image processing modes.

13. An electronic still camera as defined in claim 12 wherein said image processing mode comprise a video image reproducing mode and said additional image processing modes comprise a continuous reproduction operation.

14. The electronic still camera as defined in claim 13 wherein the continuous reproducing operation is displayed by the function of a continuous shooting mark in said display means.

15. The electronic still camera as defined in claim 12 wherein said image processing modes comprise an erasing mode and said additional image processing modes comprises an continuous erasing operation.

16. The electronic still camera as defined in claim 15 wherein the continuous erasing operation is displayed by the function of a continuous shooting mark in said display means.

17. The electronic still camera as defined in claim 5 wherein the continuous erasing operation is made radially inwardly of a magnetic disk.

18. An electronic still camera, comprising:

reproducing means for reproducing signals from a magnetic disk;

first switching means operable to reproduce signals from said magnetic disk;

second switching means operable to perform a continuous reproducing operation;

moving means for moving said reproducing means to a predetermined track; and controlling means for controlling said moving means such that, when an instruction has been issued by said second switching means to perform said continuous reproducing operation, said predetermined track is reproduced for a predetermined period of time, and following tracks are successively reproduced thereafter;

wherein during the continuous reproducing operation, the reproduction of a video track is continuously carried out until a corresponding audio track has been reproduced completely, and the following tracks are successively reproduced thereafter.

19. The electronic still camera as defined in claim 10 wherein during the continuous reproducing operation, the reproduction of a video track is continuously carried out until a corresponding audio track has been reproduced completely, and the following tracks are successively reproduced thereafter.

20. The electronic still camera as defined in claim 11 wherein during the continuous reproducing operation, the reproduction of a video track is continuously carried out until a corresponding audio track has been reproduced completely, and the following tracks are successively reproduced thereafter.

* * * * *